(12) United States Patent
Lafrance (10) Patent No.: US 6,494,014 B2
(45) Date of Patent: Dec. 17, 2002

(54) MEASURING TEMPLATE HAVING A PLURALITY OF INDICIA GROUPS EACH INCLUDING AN INDICATOR FOR INDICATING A SPACING OF THE INDICIA OF EACH OF THE GROUPS OF INDICIA

(76) Inventor: Claudex Lafrance, 196 48e Rue Ouest, Charlesbourg, Québec (CA), G1H 5G1

( * ) Notice: Subject to any disclaimer, the term of this patent is extended or adjusted under 35 U.S.C. 154(b) by 0 days.

(21) Appl. No.: 09/822,216

(22) Filed: Apr. 2, 2001

(65) Prior Publication Data

US 2001/0013178 A1 Aug. 16, 2001

Related U.S. Application Data

(63) Continuation-in-part of application No. 09/348,879, filed on Jul. 7, 1999, now abandoned, which is a continuation-in-part of application No. 09/215,458, filed on Dec. 17, 1998, now abandoned.

(51) Int. Cl.[7] .............................................. E04G 21/18
(52) U.S. Cl. ........................ 52/745.05; 52/105; 33/494; 33/758
(58) Field of Search ........................... 52/745.05, 745.1, 52/746.1, 749.1, 105, DIG. 1; 33/493, 494, 613, 645, 758, 759, 760, 771, 563

(56) References Cited

U.S. PATENT DOCUMENTS

| | | | | |
|---|---|---|---|---|
| 2,187,087 A | * | 1/1940 | Leary | 33/758 |
| 3,210,850 A | * | 10/1965 | Grzyb | 33/758 |
| 3,270,421 A | * | 9/1966 | Jones | 33/759 |
| 4,149,320 A | * | 4/1979 | Troyer et al. | 33/758 |
| 4,367,590 A | * | 1/1983 | Winter et al. | 33/758 |
| 4,670,990 A | * | 6/1987 | Horvath | 33/562 |
| 4,708,755 A | * | 11/1987 | Lambelet | 156/64 |
| 4,927,696 A | * | 5/1990 | Berg | 428/195 |
| 5,012,590 A | * | 5/1991 | Wagner et al. | 33/759 |
| 5,107,601 A | * | 4/1992 | Semchuck | 33/759 |
| 5,641,377 A | * | 6/1997 | Chung et al. | 156/577 |
| 5,666,737 A | * | 9/1997 | Ryan | 33/562 |
| 5,913,586 A | * | 6/1999 | Marshall | 33/759 |
| 5,924,213 A | * | 7/1999 | Lee | 33/494 |

FOREIGN PATENT DOCUMENTS

DE 3119962 * 12/1982 ................... 33/494

* cited by examiner

Primary Examiner—Gregory J. Strimbu
(74) Attorney, Agent, or Firm—Swabey Ogilvy Renault; Guy J. Houle (57) ABSTRACT

A framing template for use in the framing of a building structure. The template has a plurality of groups of printed measuring indicia, each measuring indicia comprising a centering mark. The centering marks for each group have a predetermined spacing therebetween. The centering marks of each group may include numbers, colors or shaped symbols indicative of a repetitive measured distance from a zero reference point of the template. The centering marks also include indicia indicating the total distance the centering mark is from the zero reference point. The numbers are readable regardless if the template is secured on a horizontal or a vertical surface. In another broad aspect, the present invention contemplates permanently affixing the template, such as with printing, on building materials requiring measurements for integrating into the building structure.

22 Claims, 11 Drawing Sheets

MEASURING TEMPLATE HAVING A PLURALITY OF INDICIA GROUPS EACH INCLUDING AN INDICATOR FOR INDICATING A SPACING OF THE INDICIA OF EACH OF THE GROUPS OF INDICIA

CROSS-REFERENCE TO RELATED APPLICATION

This is a Continuation-in-part of a Continuation-in-part Ser. No. 09/348,879 filed on Jul. 7, 1999 and now abandoned and based on parent application Ser. No. 09/215,458 filed on Dec. 17, 1998, and also abandoned.

TECHNICAL FIELD

The present invention relates to a measuring template in the form of a tape or printed on building materials for use in the framing of building structures and its method of use whereby to permit precise positioning and sacrament of building components while facilitating and accelerating the framing of building structures.

BACKGROUND ART

Various devices have been heretofore provided to assist the carpenter in the framing and construction of building structures. For example, U.S. Pat. No. 5,367,783 discloses a layout template tool which facilitates the marking of the positions of studs, joists, rafters, trusses, before nailing-in these building components in permanent position. A problem with these layout tools is they are usually constructed of metal members and they are cumbersome to use, require the user to use a pencil to mark desired locations, it is difficult to transport, some have moving parts which can be lost rendering the tool inoperative and their measuring markings wear out with periodic use often resulting in improper measurement markings. The tools also have restricted use when used close to other walls or building components, due to the fact that the tool is rigid and cannot be bent around corners.

Templates made of flat flexible thick material having adhesives thereon are also known in the cabinetry trade and other trades and an example of such is illustrated in U.S. Pat. No. 5,666,737. Such tapes are used at precise locations to indicate the position of holes when making cabinetry which require precision hardware to be installed thereon. Such templates have therefore very limited use. It is also known to use templates in the construction of housing development where repetitious measures are utilized and such a system is disclosed in U.S. Pat. No. 4,573,302. Such templates have again restrictive usage and are not practical as a measuring tool for all sorts of building structures. There is also a need in the prior art to provide a template which is securable on building surfaces to identify components which are not visible and further wherein building components may be erected directly on the templates at precise locations. There is also a need to provide a template which is easy to use, which is economical and which accelerates construction.

SUMMARY OF INVENTION

It is a feature of the present invention to provide a flexible framing template which is an improvement over the above-referenced prior art templates and which is formed from an elongated flat tape of flexible material.

It is a further feature of the present invention to provide a flexible framing template in the form of a tape and which accelerates the construction of the framing of building structures, which is easy to use, economical, and which may be adhesively secured to building materials to identify the positioning of building components or to identify the position of building components which are not visible.

Another feature of the present invention is to provide a flexible framing template in the form of a tape and which may be used as a level indicator.

Another feature of the present invention is to provide building materials on which the template of the present invention is permanently affixed thereto such as being printed thereon.

According to the above features, from a broad aspect, the present invention provides a measuring template for use in framing of building structures. The template is comprised by an elongated printed measure having two or more groups of measuring indicia. The groups of indicia are disposed at predetermined intervals from one another. There are two or more of the said predetermined intervals. Each of the groups of indicia has a center mark associated therewith. A first set of numerical markings is associated with each of the center mark of each of the groups of indicia. The center mark indicates an exact location of the numerical markings. The first set of numerical markings is identical and indicates a cumulative measure from a starting point. The numerical markings of the first set are disposed on opposed sides of the center mark on a transverse axis of the template and aligned with the center mark. A second set of identical numerical markings is disposed on a longitudinal axis of the template on opposed sides of the center mark whereby the numerical markings of the first and second sets are easily readable when the template is disposed horizontally or vertically. The groups of measuring indicia each have a distinctive identification means to distinguish said groups from one another. Each distinct identification means indicates an associated one of said two or more groups of measuring indicia. The sets of numerical markings of distinct identification means groups define a numerical spacing between the groups of measuring indicia.

According to a still further broad aspect of the present invention there is provided a measuring template for use in framing of building structures. The template is comprised by an elongated printed measure having two or more groups of measuring indicia. The groups of indicia are disposed at predetermined intervals from one another. There are two or more of the said predetermined intervals. Each of the groups of indicia has a center mark associated therewith. A first set of numerical markings is associated with each of the center mark of each of the groups of indicia. The center mark indicates an exact location of the numerical markings. The first set of numerical markings is identical and indicates a cumulative measure from a starting point. The numerical markings of the first set are disposed on opposed sides of the center mark on a transverse axis of the template and aligned with the center mark. A second set of identical numerical markings is disposed on a longitudinal axis of the template on opposed sides of the center mark whereby the numerical markings of the first and second sets are easily readable when the template is disposed horizontally or vertically. Each group of indicia is further provided with a cumulative numbered indicia adjacent the center mark and indicating a cumulative number of building components required from said starting point to each said center mark.

BRIEF DESCRIPTION OF DRAWINGS

A preferred embodiment of the present invention will now be described with reference to the accompanying drawings in which.

DESCRIPTION OF PREFERRED EMBODIMENTS

Referring to the drawings, and more specifically to FIGS. 1A to 1E, there is shown the measuring template 10 of the present invention for use in the framing of building structures, wherein such structures are framed by building components such as studs, joists, rafters, trusses and the like components be they fabricated of wood or metal, as is common in the trade. As shown in FIGS. 1A to 1E, the template 10 is comprised of an elongated flat tape 11 constructed of flexible material such as treated paper, vinyl, thermoplastics, cardboard, etc. and which is non-stretchable, or if stretched will re-assume its initial condition. FIGS. 1A to 1E illustrate a single tape having a total length of 192 inches. The elongated flat tape 11 has a top face 12 and a back face 13 and defines opposed elongated parallel side edges 14 and 14'.

A plurality of groups of center marks and attendant measuring indicias 15 are spaced apart at predetermined distances along the tape over the top face 12 thereof. The spacing of these group of measuring indicias 15 correspond to the spacing desired between building components, such as 12 inches, 16 inches, 18 inches, etc., which is customary in the trade for spacing and securing studs, joists, or rafters. For example, as illustrated in FIG. 1D, there is shown a first group of indicia 15' indicating 12 inch stud spacing at 108 inches whereas the next group of indicia 15" indicates the position of a stud at 16 inch spacing but a distance of 112 inches from the starting point or the 0 indicia 16, as illustrated in FIG. 1A.

Figures 1A, 1B:
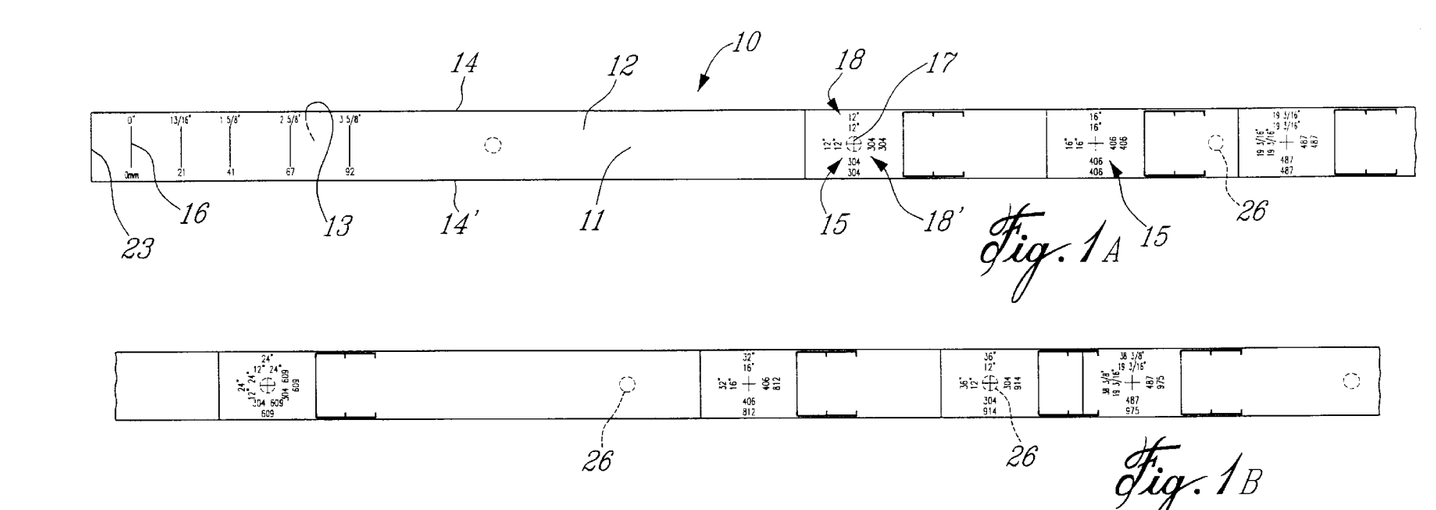
FIG. 1A is a plan view showing a first section a flexible framing template of the present invention, herein constituted by an elongated flat tape.
FIG. 1B is a plan view showing a second section of the flexible framing template.
Figure 1C:
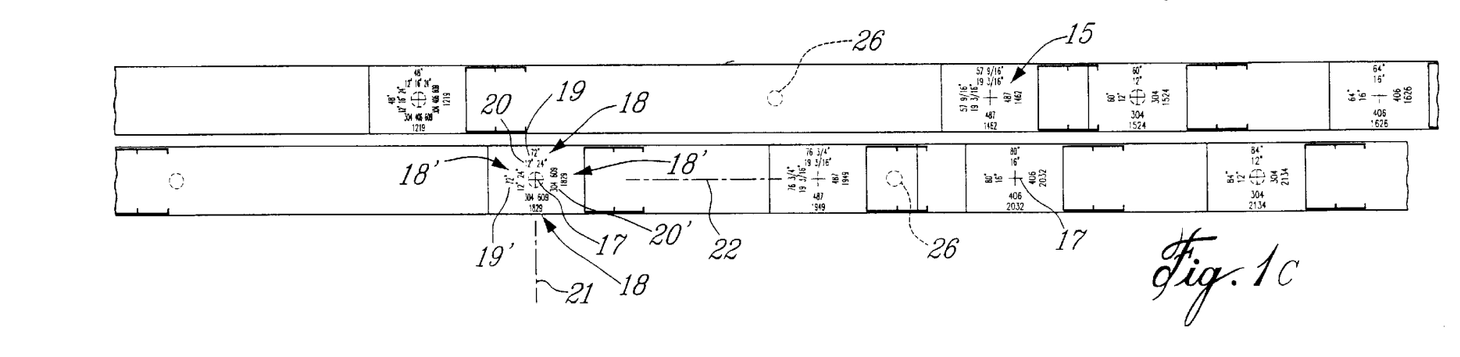
FIG. 1C is a plan view showing further continuing sections of the flexible framing template.
Figure 1D:
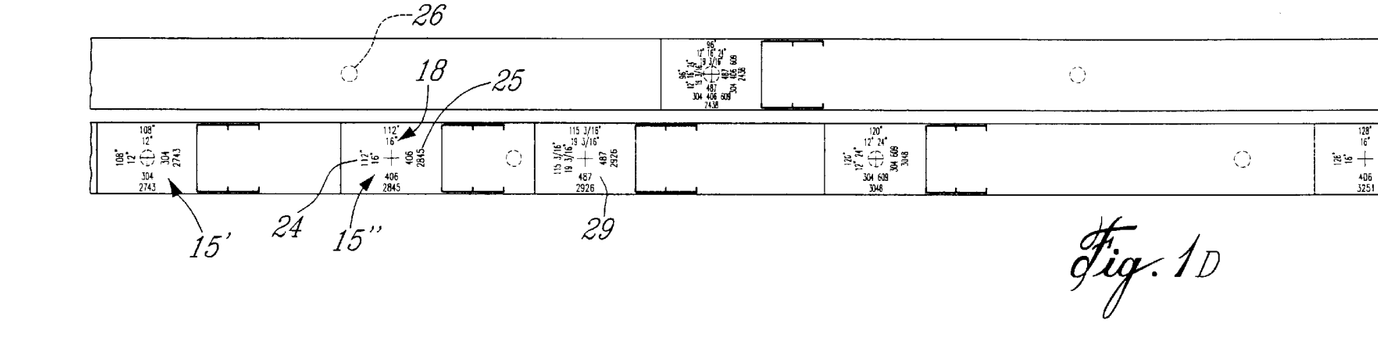
FIG. 1D is a plan view showing still further continuing sections of the flexible framing template.

As hereinshown in FIG. 1A, each of the groups of indicia 15 has a center marking 17, herein in the form of a cross, which is disposed at mid-width between the opposed parallel side edges 14 and 14'. As shown in FIG. 1C, a first set of numbered markings 18 is associated with the center marking 17. The numbered markings of the first set are identical and indicative of a cumulative measure as represented by the numbered indicia 19 from the starting point 0 indicia 16, and also indicative of an associated repetitive measure as represented by numerical marking 20. As hereinshown, the cumulative indicia is 72 inches while the repetitive measure is 12 inches or 24 inches indicating that studs or rafters are disposed at 12 inch or 24 inch center from one another.

The first set of numbered markings 18, consisting of markings 19 and 20 is disposed to each side of the center marking on a transverse axis 21 aligned with the center marking 17. A second set of numbered markings 18' representative by numerical marking 19' and 20' is disposed on the longitudinal central axis 22 of the tape and to each opposed sides of the center marking 17 whereby these first and second sets of marking can be easily read by a user when the tape is disposed horizontally or vertically.

As shown in FIG. 1A, the tape is provided with an end extension or tab portion 23 in which a nail or other fastener can be placed to secure the tape on a flat surface, such as on a floor surface or on a vertical stud. Other forms of attachment means will be described later with reference to further embodiments of the framing template tape of the present invention. For example, the attachment means may be constituted by an adhesive surface.

Referring to FIG. 1D, it can be seen that the groups of measuring indicias 15' and 15" have sets of numbered markings indicative of conversion measures herein the English measure 24 and metric measures 25. The groups 15' and 15" of measuring indicias on the vertical axis 21, see FIG. 1C, are associated with one another while those on the horizontal axis 22 are also associated with one another. As also shown in FIG. 1B, there is provided a further marking in the form of a circle 26 and this is provided every 6 or 12 inches along the tape whereby to permit holes to be made in studs or cross pieces whereby to permit wiring or pipes to be laid between walls or rafters at predetermined aligned locations. For example, in the construction of a wall once the frame is erected with the studs in position, a tape can be attached to opposed vertical end studs and a line can be drawn on the studs at a predetermined selected hole location on the tape. Markings can then be made on each stud to indicate the exact position where the holes are to be drilled to accommodate the passage of electrical wiring, cables and pipes.

Figure 1E:
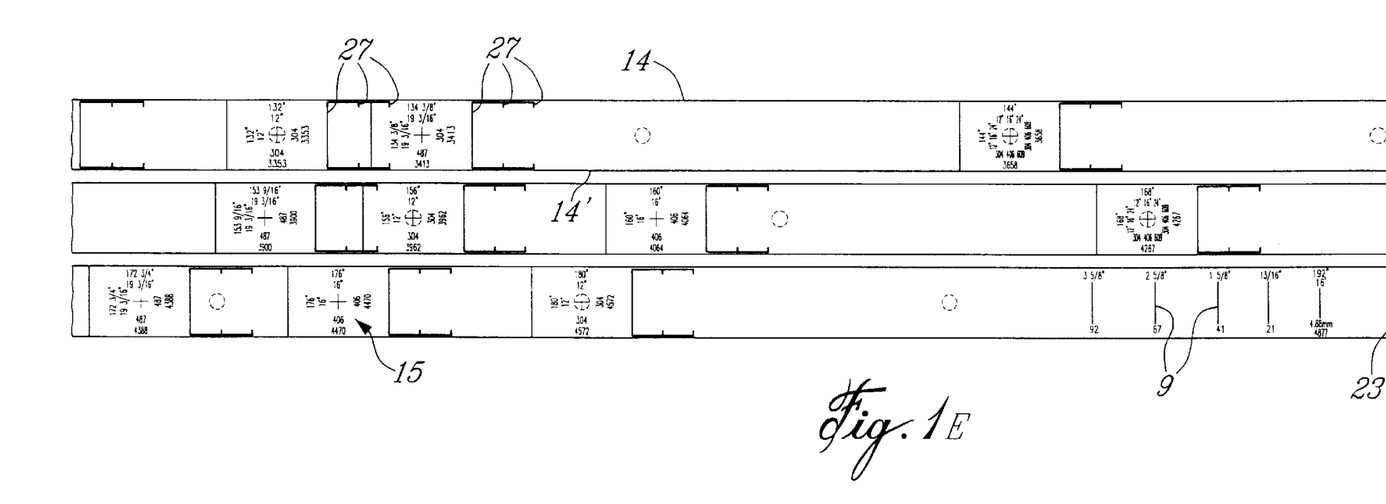
FIG. 1E is a plan view showing additional continuing section of the flexible framing template.

As shown in FIG. 1E, edge aligning markings 27 are disposed at predetermined spaced intervals, herein ½ inch intervals on each end of a group of measuring indicia 15, and transversely of the opposed side edges 14 and 14' of the tape whereby to permit perfect transverse and centered alignment of studs on a bottom flat horizontal stud, not shown, but obvious to a person skilled in the art. Indicias 9 at the front end and rear end of the tape provide for alignment of a first and last stud, see FIGS. 1E and 2. Although not shown, the tape may be made of thick plastic material and have rectangular depressions at the marking indicias to facilitate locating the ends of studs or side edges of joists or rafters.

Figure 2:
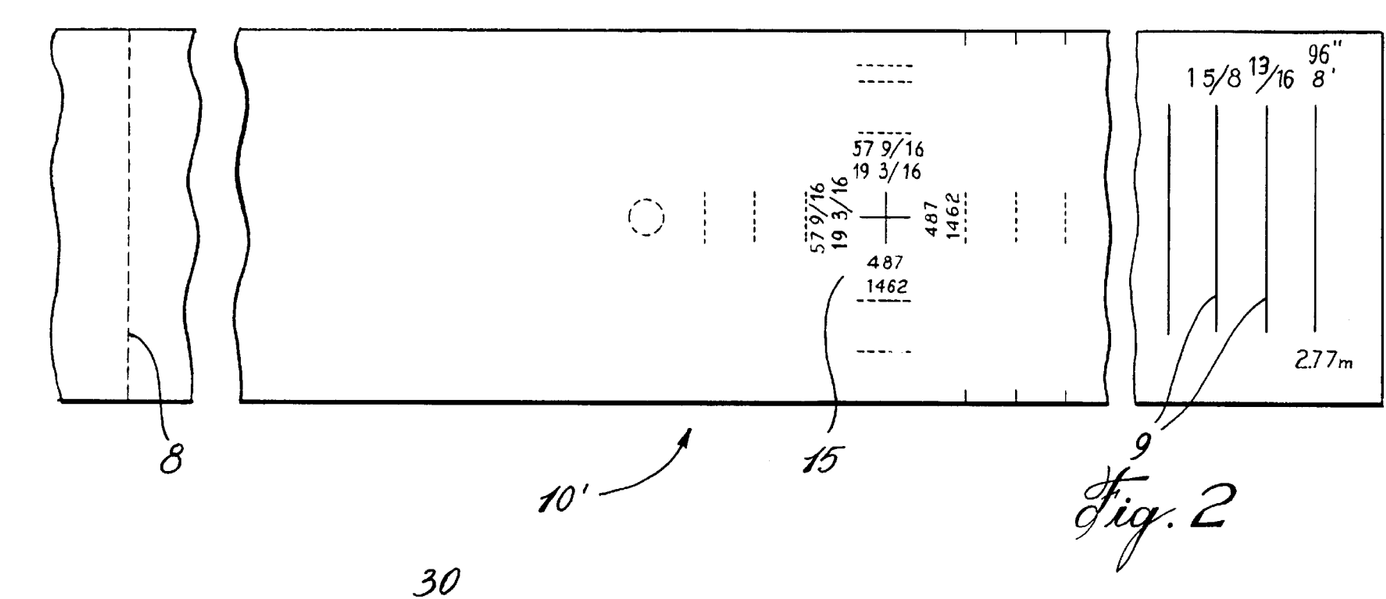
FIG. 2 is a fragmented plan view of a wider flexible framing template tape on which building components are positioned and secured with the tape remaining permanently in place.

As shown in FIG. 2, the tape 10' can be of a much wider width, herein equivalent to a 2×3 or 2×4 piece of lumber for sacrament on the top face of the flat horizontal bottom stud. The tape 10' is also provided with serrated perforations 8 disposed on a transverse axis of the tape at predetermined intervals to permit the tape to be segmented into parts. For example, the tape could be segmented in 4 foot parts which is a standard measuring length in construction.

It is pointed out that in order to quickly identify the groups of measuring indicias 15' and 15", see FIG. 1D, from one another, these may be printed of different colors. That is to say, the numerical markings around the center markings that have a common spacing therebetween have a distinct color from other numerical markings associated with center markings of different spacings. The colors constitute identification means. Accordingly, all of the groups of indicias relating to 12 inch spacing will be printed of one color whereas the 16 inch spacings will be a different color as well as the 18 inch spacings, etc. Other groups of indicias may be provided as identified by reference numeral 29 in FIG. 1D to represent spacings for joists or rafters or trusses.

Figure 3:
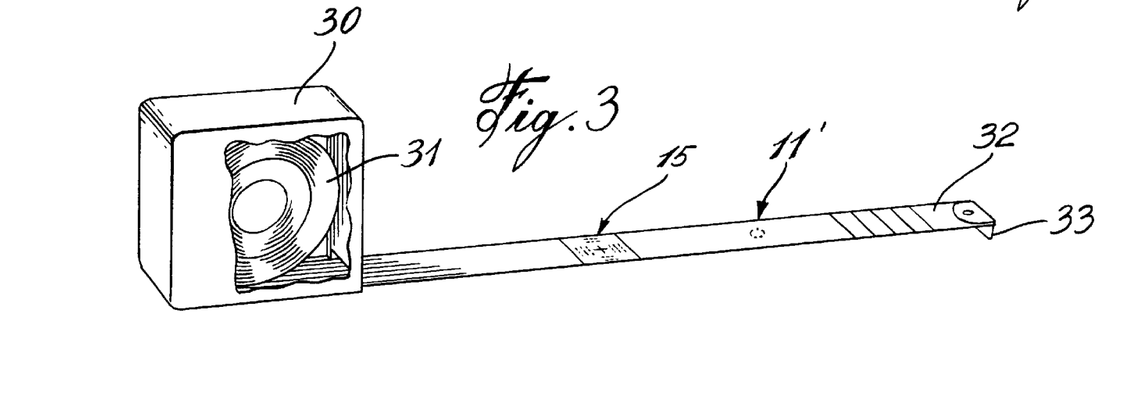
FIG. 3 is a perspective view showing the flexible framing template of the present invention, herein constituted as a flexible elongated tape wound about a spring-loaded spool secured in a tape housing, much like the conventional measuring tape.

As shown in FIG. 3, the framing template tape, hereinshown at 11', is an elongated retractable band formed of thin flexible metal which is coiled in a tape housing 30 on a retractable spool 31 and operated in the same fashion as the well known measuring tape. The retention means at the free end 32 of the tape is constituted by a hook end 33. The group of measuring indicias 15 as well as all the other indicia markings are provided on the tape. This makes for a very compact and easily portable framing template.

Figures 4A, 4B:
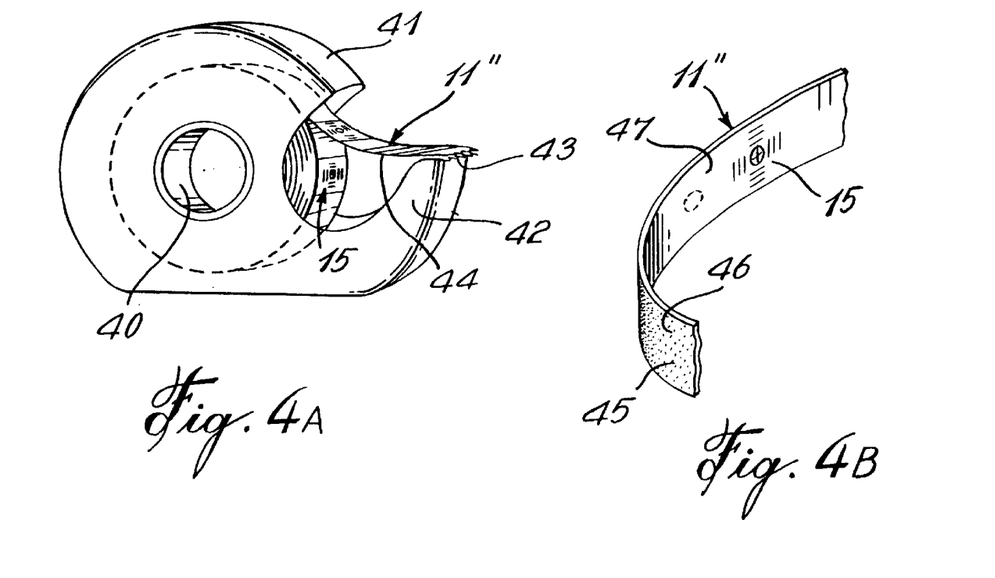
FIG. 4A is a further perspective view showing the framing template tape constructed as a thin thermoplastic tape housed within a tape dispenser and wherein the tape has an adhesive surface and a release agent coated top surface with the marking indicias being provided on the top surface.
FIG. 4B is a perspective view showing a section of tape dispensed from the dispenser of FIG. 4A whereby to illustrate the construction of the tape.
Figure 9:
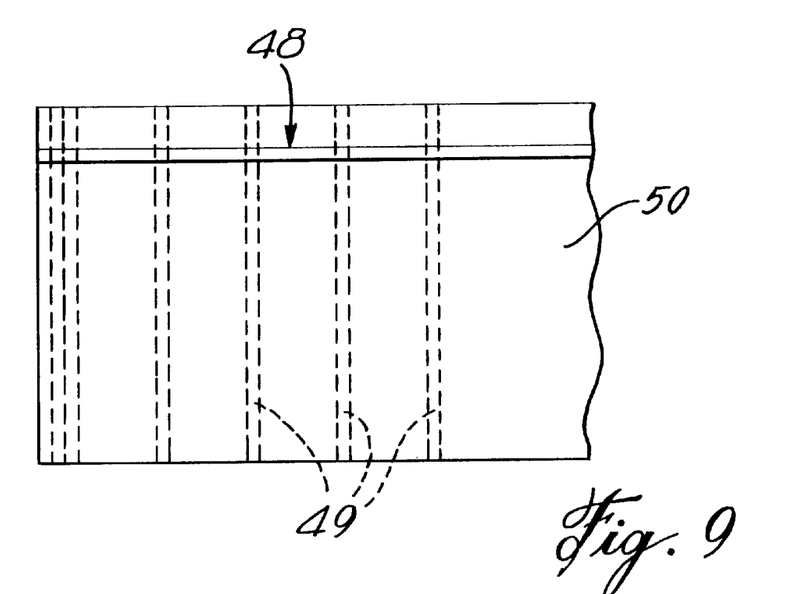
FIG. 9 is a plan view showing the framing template tape secured on wall sheeting material, either exterior or interior to indicate the position of studs, rafters, etc. whereby to drive the nails or screws in the sheeting material for engagement with the studs.

Referring now to FIGS. 4A to 4D, there is shown examples of the construction of the housings for the framing template tape 11". As shown in FIGS. 4A and 4B the tape 11" is formed as an elongated thin tape of thermoplastic material much like the tape that is utilized in office supplies and wound about a spool 40 detachably secured in a tape dispenser housing 41. The housing has an integrally formed projecting arm 42 which is provided with a straight serrated edge 43 over which the free end portion 44 of the tape 11" extends. The tape 11", as shown in FIG. 4B, has an adhesive 45 impregnated on its back surface 46 with the groups of indicia means and other indicia means 15 being printed on the top face 47 of the tape. Preferably, but not exclusively, the tape is a transparent thermoplastic tape. Accordingly, in use the free end of the tape is withdrawn from the housing 41 to a desired length, usually a 4 foot length and detached by positioning a 4 foot end mark along the serrated edge 43 to cut off or rip off the tape. Another 4 foot measure is then printed on the next section of tape and containing the same or continuing length indicias. Of course, the tape could be formed with any desirable length of indicia markings but a 4 foot length of such tape is easier to handle. As can be seen, an advantage of such tape is that it is very compact, easy to carry and can be affixed to wall surfaces, as shown in FIG. 9 at 48 whereby to locate the position of studs 49 or rafters or joists behind a wall surface 50 or floor surface, as is obvious. The tape is easy to cut at any desired length. This tape is also particularly useful for exterior wall sheeting.

Figure 4C:
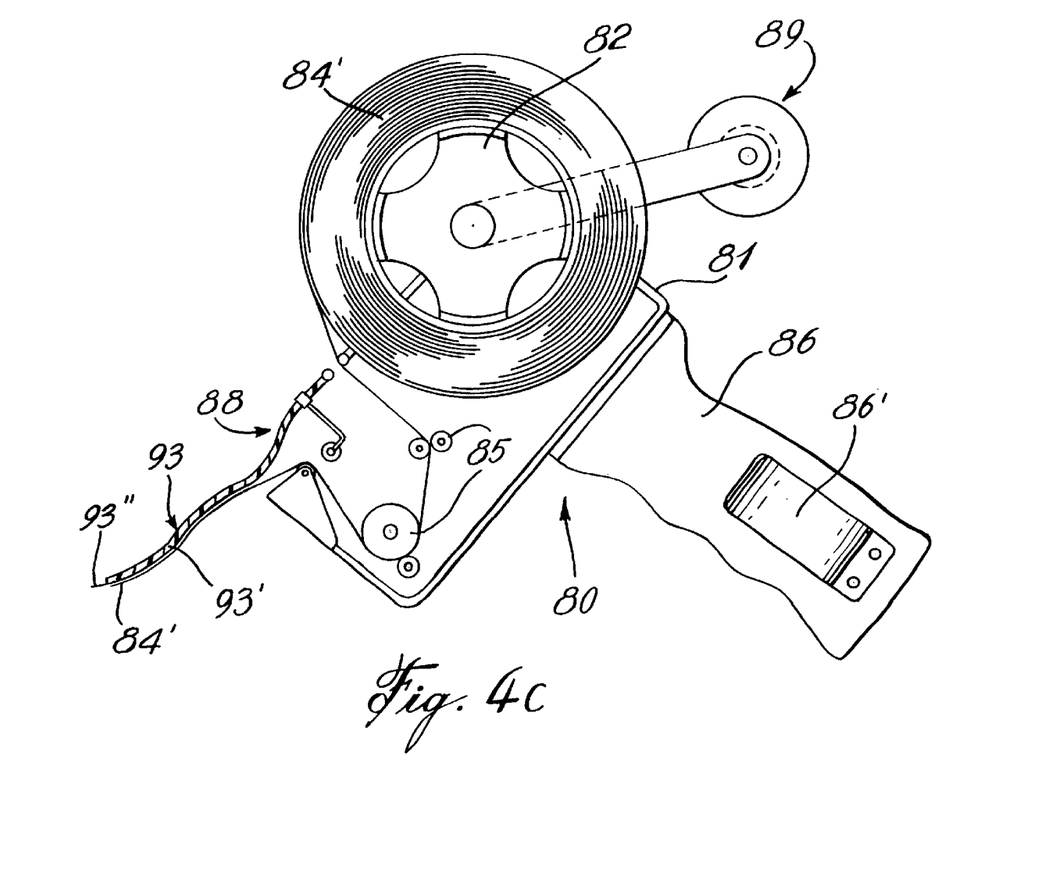
FIG. 4C is a side view of a dispenser for a large tape spool which may or may not have an adhesive backing whereby to facilitate the application of the tape over a surface.

Referring now to FIG. 4C there is shown generally at 80 another form of tape housing and it consists of a tape support bracket 81 having a freely rotatable spool 82 on which a large tape 83 constructed in accordance with the present invention is mounted. The tape 83 is constructed in accordance with that shown FIG. 4B and is guided in the support bracket 81 by guide rolls 85. A handle 86 is secured to the bracket 81 and provided with a belt clip 86' to secure the housing 80 to the pant belt of the user. A flexile pressure applying tongue 93 is secured adjacent the mouth opening 88 to engage the tape on a wall surface. The tongue has a curved portion 93' at a free end thereof for this purpose. A serrated end edge 93" cuts the tape at a desired location. To dispense the tape the free end 84' of the tape is stuck at a predetermined location on a wall surface or floor or ceiling etc. and by pulling the device while applying pressure on the tape with the tongue 93 the tape is dispensed automatically and quickly and secured on a surface. To sever the tape at a desired position the straight serrated edge 93" is pushed against the tape. A crank handle assembly 89 is secured to the spool 82 should the tape 83 not be an adhesive but a reusable tape. When such a tape is used the bracket 81 would be provided with a face plate to maintain the tape spool 83 and the tape in substantially perfect alignment.

Figure 4D:
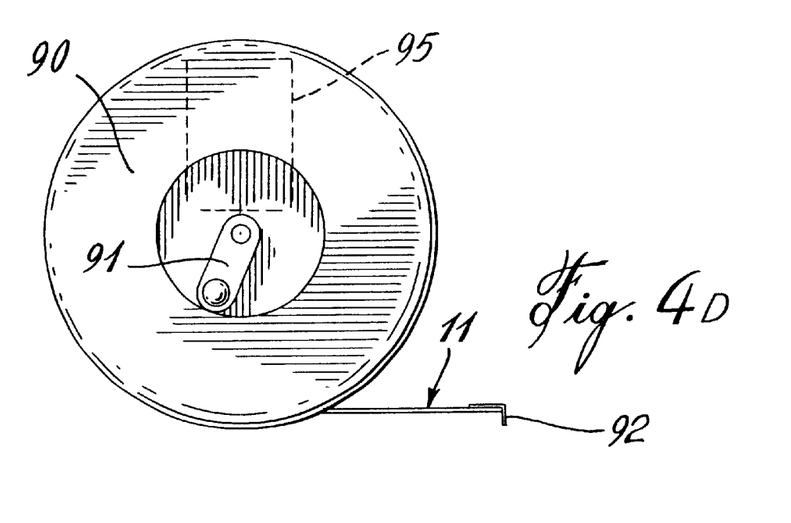
FIG. 4D is a side view of a further tape housing having a tape retracting crank, much like a standard type measuring tape housing.

As shown in FIG. 4D the framing tape 11 may be mounted in a very large housing 90 to contain well over a 100 ft of tape. A crank handle 91 is used to retract the tape 11 back into the housing. A hook end 92 is secured to the tape 11. A belt clip 95 may also be secured to the housing.

Figure 4E:
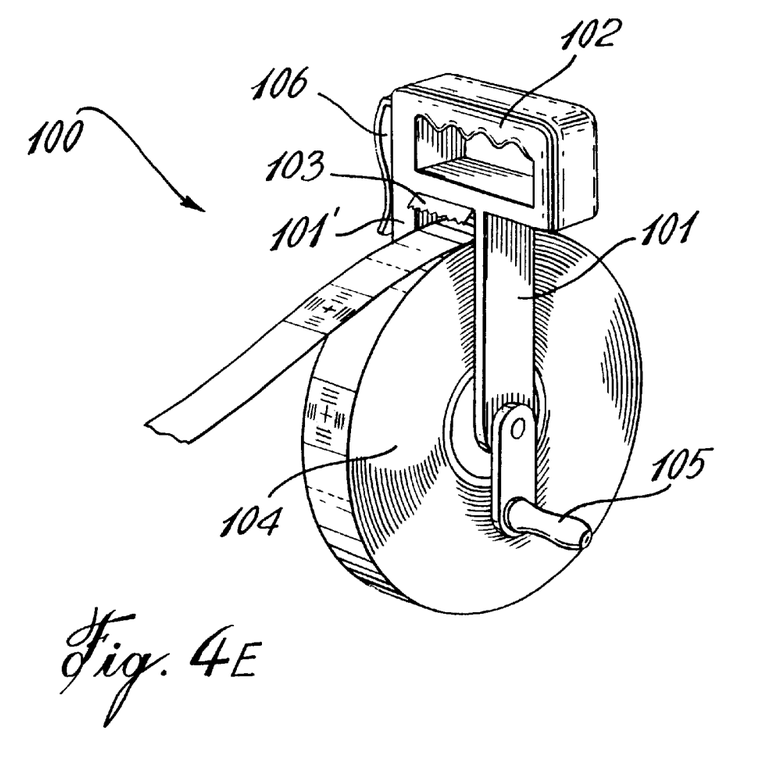
FIG. 4E is a perspective view of a simplified dispenser of the type shown in FIG. 4C.

As shown in FIG. 4E, the dispenser housing 100 is of a simple design and comprised of a pair of tape support arms 101 and 101' integrally molded with a handle 102. A serrated flange 103 projects from under the handle 102 and spaced above the tape roll 104 to sever the tape, as previously described. A collapsible handle 105 is secured to the arm 101, but this may not be required if the tape is not reusable. A belt clip 106 is secured adjacent the handle 102 to secure the dispenser on a pant belt.

Figure 5:
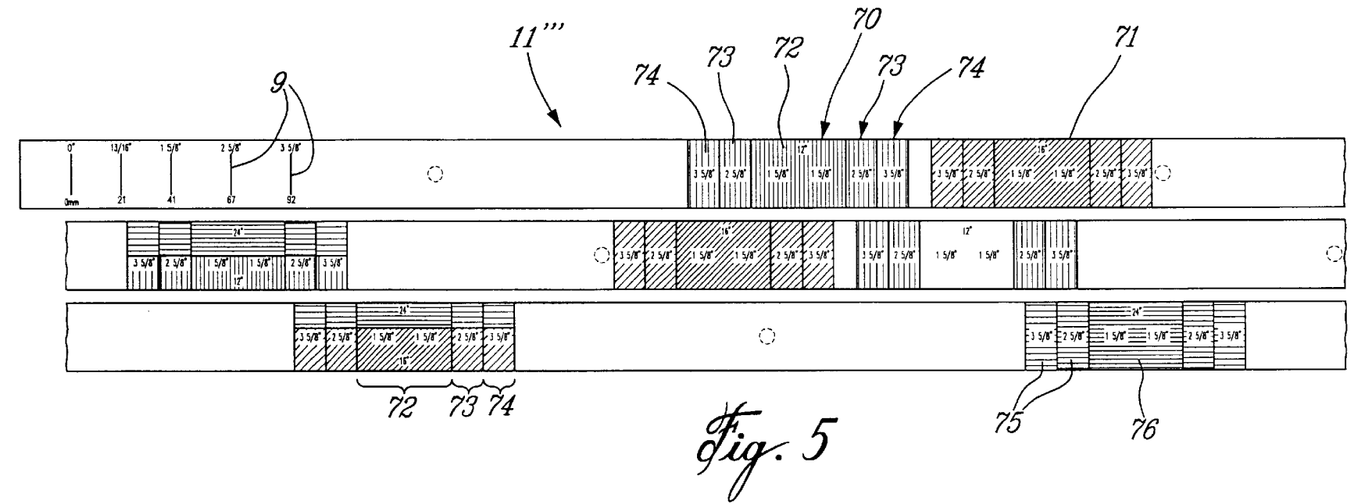
FIG. 5 is a plan view showing another example of the flexible framing tape wherein the indicias are in the form of color code transverse bars.

With reference now to FIG. 5, there is shown a further example of the flexible framing template tape 11''' of the present invention. As hereinshown the tape contains groups of indicias, herein groups 70 and 71 representative respectively of 12 inch and 16 inch spacings and which are distinguished from one another by a color. For example the 12 inch spacing group may have a red color while the 16 inch may have a blue color. The group of colors are in the form of color bars with a large bar 72 being positioned at the center and smaller adjacent bars 73 and 74 disposed on opposed sides and identified with the same color but having a different shading. This will permit again the proper positioning of joist or rafters in center alignment with the larger central bar 72. Numerical values or markings 75 may be positioned on each of the bars 72, 73 and 74 to indicate the width of the studs being used to further indicate to the user how to properly center these studs. The center of the groups of indicias could be indicated by a transverse narrow bar of a different contrast or color as shown at 76 in FIG. 5.

Figure 6:
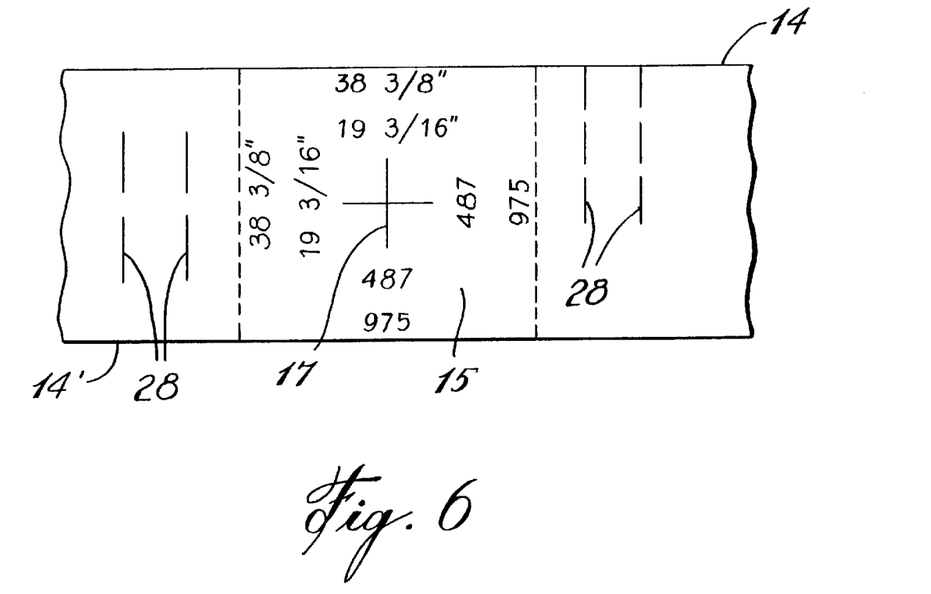
FIG. 6 is an enlarged view of a section of the tape showing edge aligning markings associated with a group of measuring indicias.

As shown in FIG. 6, edge aligning markings 28 may also be provided on the wide tapes, as shown in FIG. 2 wherein the tape is permanently retained within the construction framing. As previously described, this facilitates the positioning of studs or cross pieces which lie over and cover entirely the group measuring indicia 15. By aligning the edges of the stud with these markings it is possible to position the studs centrally with the center marking 17 and square with the side edges 14 and 14' of the tape, eliminating wall covering undulations.

Figure 7:
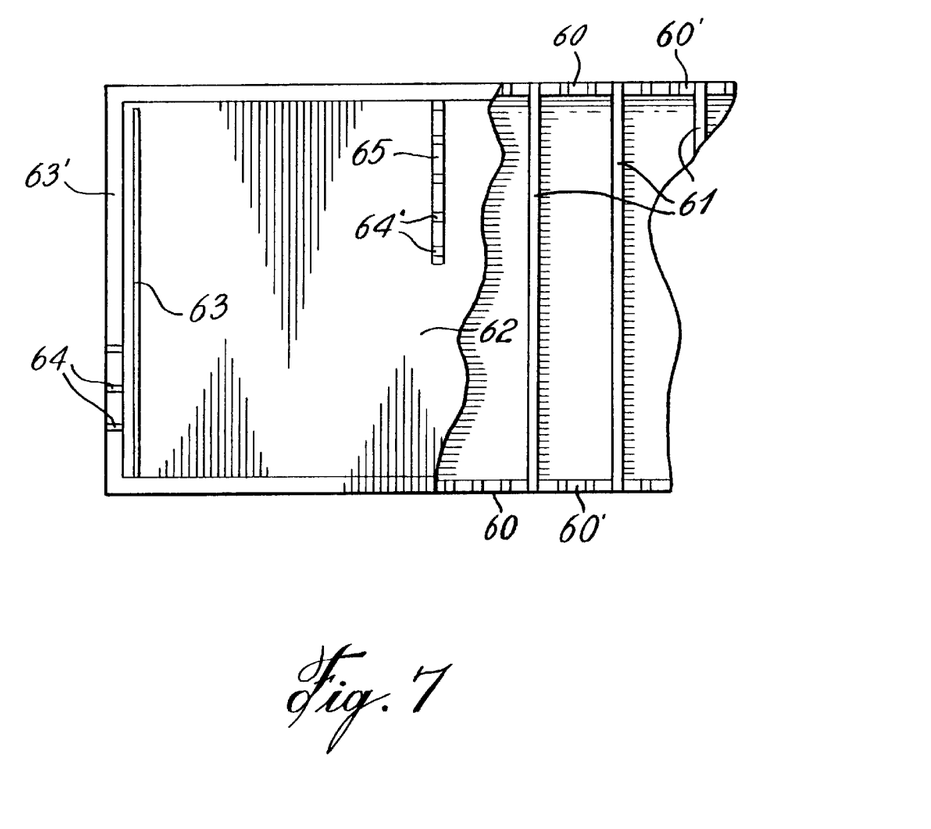
FIG. 7 is a fragmented section view of a floor plan showing the method of use of two embodiments of the framing template tape of the present invention utilized therewith.

FIG. 7 illustrates the method of use of the flexible framing template tape of the present invention. As hereinshown a framing template tape 60 may be secured over a sill plate 60' to indicate the spacing and location of the floor joists 61 to indicate the positioning of the joists to construct a floor. Once the floor covering 62 is secured over the joist, these tapes can then be used to form the walls. The tape could either be temporarily secured on the floor surface, such as illustrated at 63 in front of the foot plate stud 63' to indicate the position of the vertical studs 64 or else the wider tape as shown in FIG. 2 could be secured on the foot plate stud, as shown at 65, with the vertical studs 64' secured over the tape. It can therefore be appreciated that by the use of these tapes accurate framing of building structures is achievable and the use of the tape speeds up the construction process. It also is of great assistance to the apprentice carpenter or handyman who wishes to erect a structure but does not have the experience of the carpenter.

Figure 8:
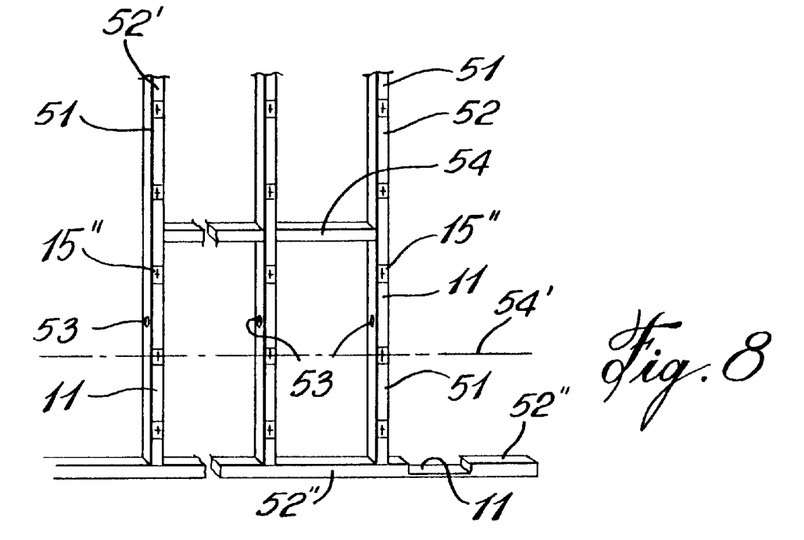
FIG. 8 is a perspective view showing the framing template tape secured to the edge face of a framing stud when constructing vertical walls.

As shown in FIG. 8, the tape can also be secured on the edge faces of the studs 52 after these have been secured on the bottom flat horizontal foot plate stud 52''. The measuring tape 11 is attached to the faces 51 of the end ones of the studs, herein studs 52 and 52', making sure that the tape markings are level with one another, that is to say, that a specific group, say the 112 inch mark of the 16 inch spacing group 15'', of each of the tapes 11 line up with the level line 54'. By doing so, all of the markings line up and if it is desirable to drill holes 53 within the studs, then a selected one of the hole markings 26 is selected whereby to line up the drill bit to drill the holes. These holes can accommodate plumbing or wiring, as previously mentioned. The markings on the tape are also utilized to locate cross braces 54 that are secured between the studs 51 and 51', in perfect alignment.

As shown in FIG. 9 the tape 48 may be secured across a wall surface 50 to identify hidden joists 49 when required to provide for the attachment of heavy elements on the wall surface 50 whereby to connect fasteners to one or more of the hidden joists 49. The tape 48 could also be secured vertically on the wall 50 to locate forences behind gypboard.

Figure 10A:
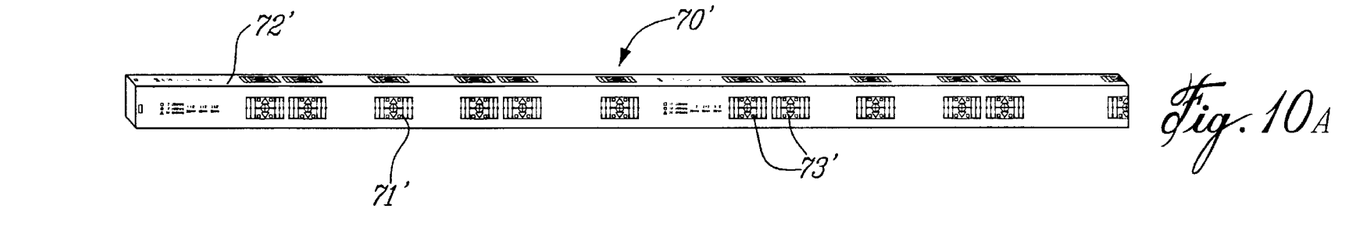
FIG. 10A is a perspective view showing a building material, herein a wooden stud having the template of the present invention printed along opposed side faces thereof.

Referring to FIG. 10A there is shown another aspect of the present invention wherein the measuring template is herein provided on building materials and most specifically on a framing stud 70'. The template permits the stud to be cut or affixed to other studs at predetermined intervals as determined by the printed template 71' which is printed along a straight line or a straight edge 72' of the stud 70'. As previously described, the template 71' consists of groups of measuring indicias 73' which are disposed at predetermined intervals from one another along this straight line. Each group of indicia 73' has identification means to identify the groups from one another, as previously described and this is preferably provided by having a different color. Accordingly, it can be appreciated that during the erection of a building structure all these building materials have pre-measurements thereon thereby greatly facilitating the erection process of the building.

Figure 10B:
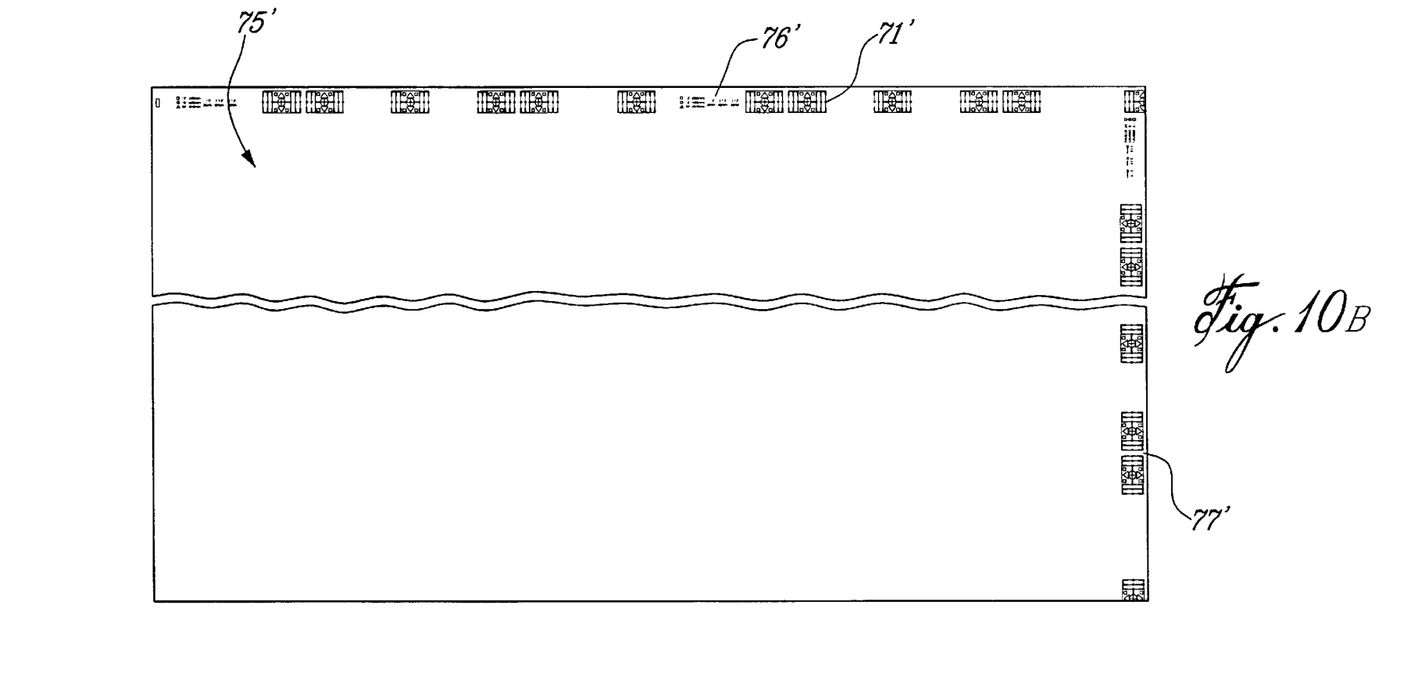
FIG. 10B is another type of building material, herein a 4×8 ft. sheet of plywood, gypsum, insulating board, etc. on which a plurality of groups of measuring indicias in accordance with the present invention have been printed along straight edges or along a straight line on a surface or opposed surfaces of the sheet.
Figure 10C:
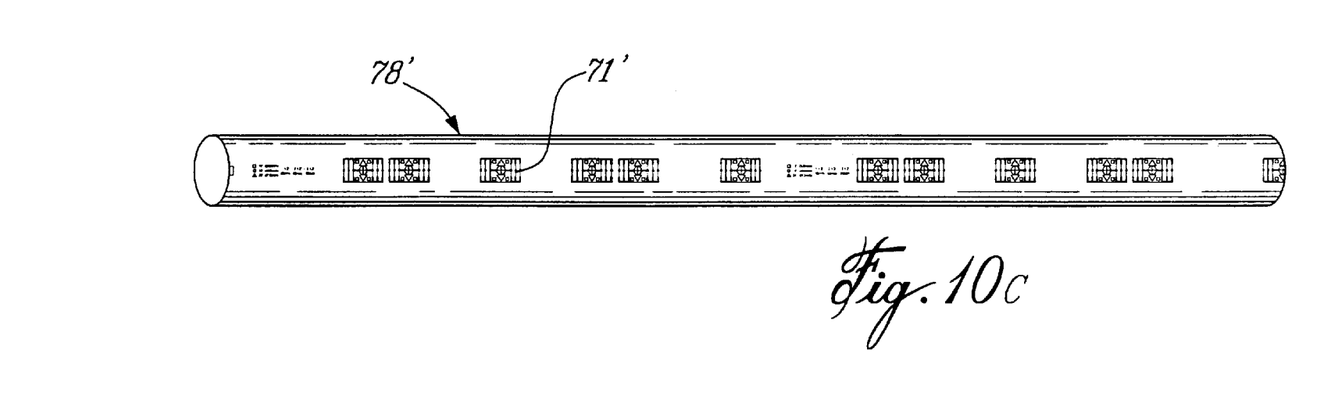
FIG. 10C is a perspective view of a pipe having the measuring indicias printed thereon.

FIG. 10B shows another type of building materials, herein a 4×8 ft sheet 75' of plywood, gypsum, insulating board etc. and on which the template 71' is printed along an elongated straight edge 76' and transverse edge 77' thereof. This also facilitates the erection of a building structure and the cutting of the board or stud. Of course, the template of the present invention can be printed or otherwise permanently applied to various other building materials such as metals, studs, piping either plastic or metal, as shown at 78' in FIG. 10C, and all types of wall coverings and any such materials needing to be cut or secured to other building materials at precise locations. It is preferable when printing the indicias on gypsum board to utilize an ink which is easily covered by paint so that they do not show through the surface of the board once a wall surface is painted.

Figure 11:
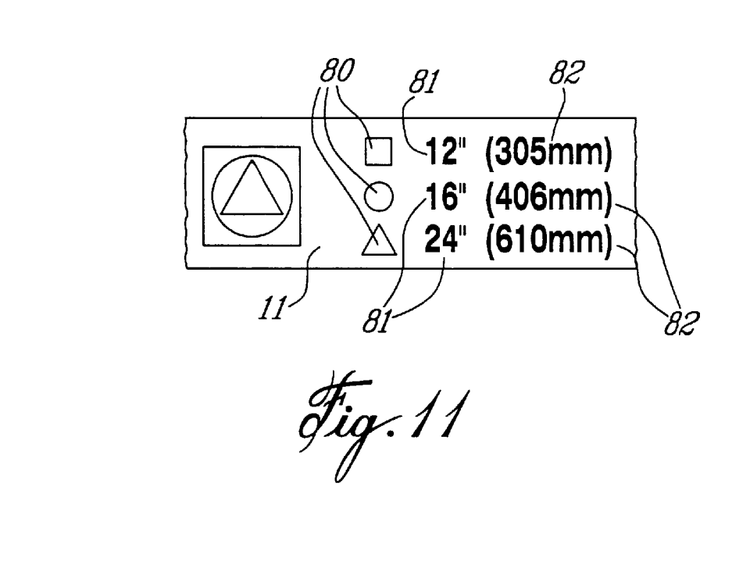
FIG. 11 is a plan view showing a section of the framing template and which includes shaped symbol for distinguishing the groups of indicia.

Referring now to FIG. 11 there is shown a plan view of a section of a measuring template, herein a section usually located closer to the beginning of the tape and which contains group identification means constituted by shaped symbols 80 which are different in shape and which are each associated with a repetitive measure 81. The symbols 80 and its associated measure 81 are indicative of a group of measuring indicia. As hereinshown the measures 81 are English measures and have their associated metric measures 82 next to them. These logos appear on each measuring indicia associated with each of the groups. For example, as shown in FIG. 12 the measuring indicia 83 is associated with the square shaped logo 80 and its measure 81 as well as its metric equivalent 82 appear both on a transverse or vertical axis of the tape 11 as well as on its horizontal axis and to each side of the center marking 17.

Figure 12:
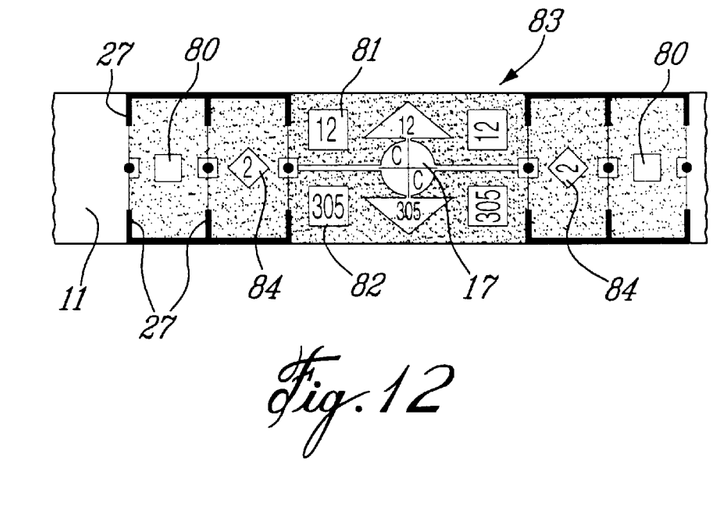
FIG. 12 is a plan section view of a template section showing the use of the shaped symbol and further including a cumulative numbered indicia.

As also shown in FIG. 12 the measuring indicia 83 is further provided with a cumulative numbered indicia 84 placed on opposed sides of the center mark 17 at a convenient location and also on the transverse vertical and horizontal axis of the tape. These cumulative numbered indicias contain a number which identifies the number of building components required at that specific measuring indicia from the starting point indicia 16 of the tape, shown in FIG. 1A. Accordingly, the user of the tape knows exactly the number of building components required along the tape up to a specific measuring indicia when utilizing a selected group of indicia for its construction project. The purpose of the shaped symbol 80 is to identify to a person who is color-blind the indicias 83 associated with each of the groups, as shown in FIG. 11.

Figure 13:
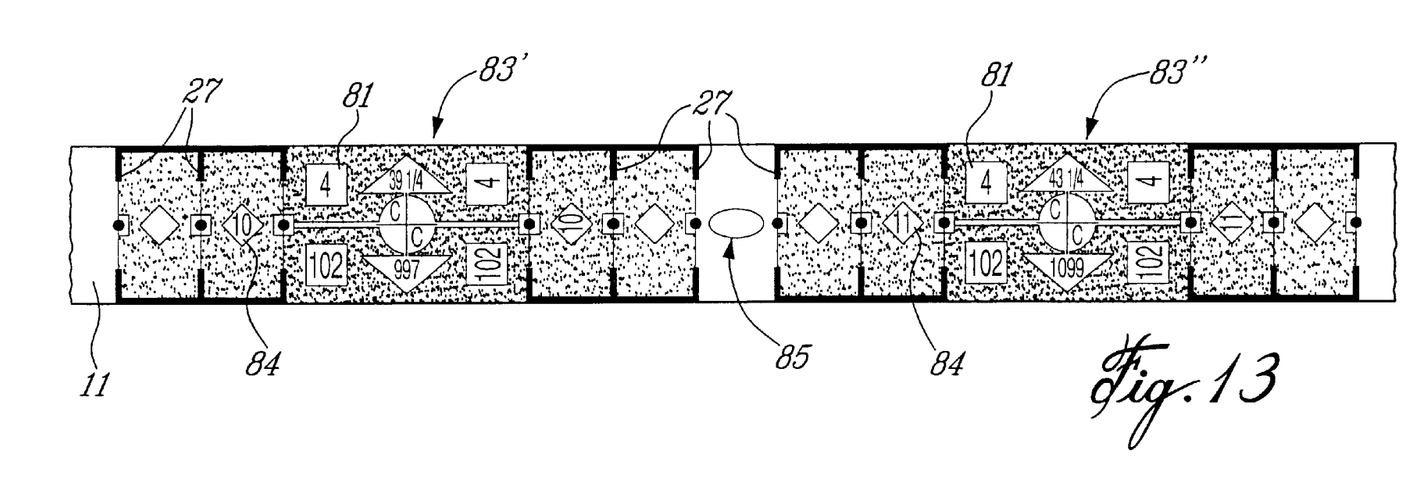
FIG. 13 is a plan view of a further section of a template illustrating a single group of measuring indicia which repeats every four inches.

FIG. 13 is a plan view of a further tape 11 and wherein there is provided only a single group of measuring indicia, such as for use in the construction of a guard rail where guard posts are disposed every four inches. Accordingly, the numerical markings 81 associated with each indicia 83" is the same whereas the cumulative numbered indicia 84 increases by one at each adjacent measuring indicia 83" along the tape. The tape may also contain a logo 85 identifying a company or product.

Figure 14:
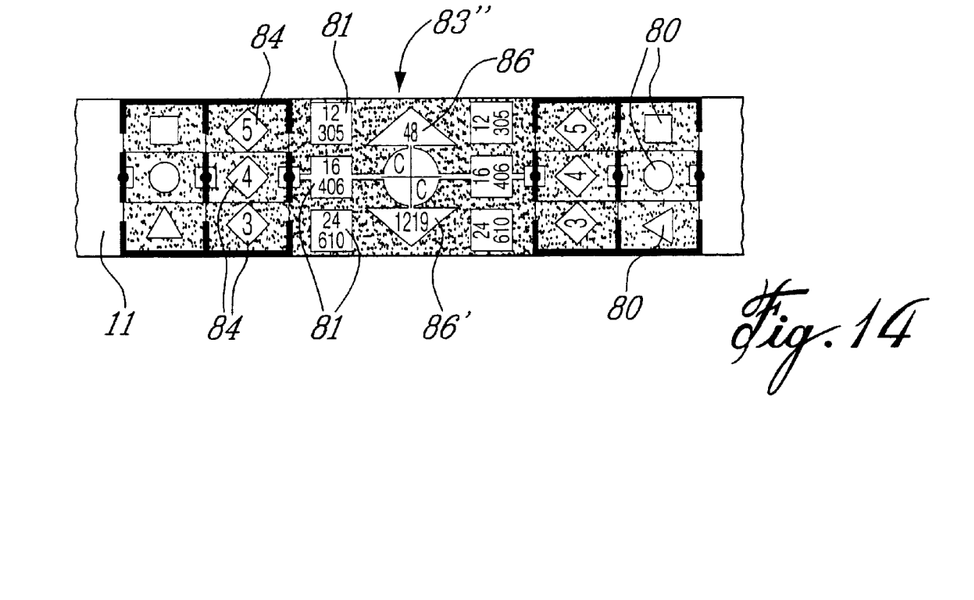
FIG. 14 is a plan view of a section of a template illustrating a measuring indicia which is common to three groups of measuring indicia.

FIG. 14 is a plan view showing a further measuring indicia, herein indicia 83' located somewhere along a tape 11 and wherein the indicia 83' is common to three different groups of measuring indicia. For example measuring indicia 83' is common to all three groups as identified in FIG. 11 and therefore, on that indicia there will appear three groups spacing indicias 81 and three different cumulative numbered indicia 84 as well as three distinct shaped symbols 80. The indicia 86 indicates the distance along the tape in English and in metric as shown at 86' also, as previously described the measuring indicias 83 are colored indicias printed as above described and the shade of the color varies between the aligning markings 27. It is also pointed out that the shaped symbols 80 also have color which is the same as their associated measure indicias 83 of the same group. The aligning marks 27 are also spaced from the center mark 17 at a predetermined distance depending on the width of the construction materials being utilized. For example, the closest marking 27 closest to the center mark will be for aligning stud joists or other such building components having a width of 1½ inches, whereas the adjacent aligning mark will be for building material of 2½ inches and the next one for building material of 3½ inches in width.

It is within the ambit of the present invention to cover any obvious modifications of the preferred embodiment described herein, provided such modifications fall within the scope of the appended claims.

What is claimed is:

1. A measuring template for use in framing building structures, said template being comprised by an elongated measure having a plurality of distinct groups of printed measuring indicia, said measuring indicia of each group of said plurality of groups of measuring indicia being disposed at a predetermined spaced interval along said elongated measure, said predetermined interval of each of said groups being different from one another; each indicia having a center mark with numerical markings disposed adjacent said center mark, each measuring indicia including a first set of said numerical markings associated with said center mark indicating an exact location of said measuring indicia along said elongated measure, said first set of numerical markings of each said measuring indicia in each said plurality of groups of measuring indicia indicating a cumulative measure from a starting zero measuring mark, said numerical markings of each said first set of said numerical markings being disposed opposite one another with a respective one of said center marks disposed therebetween and on a transverse axis of said template and aligned with said respective center mark, each measuring indicia also including a second set of said numerical markings identical to said first set being disposed on a longitudinal axis of said template on opposite one another with a respective one of said center marks disposed therebetween, wherein one of said sets of said numerical markings of said first and second sets is upwardly disposed when said template is positioned one of horizontally or vertically, each distinct group of measuring indicia of said plurality of groups having a distinctive identification means for distinguishing said groups of measuring indicia from each other, said numerical markings of each said measuring indicia of each of said groups identifying said spaced interval associated with said group of measuring indicia, each group of measuring indicia including at least one blank space having no measuring indicia therein extending from one of said measuring indicia of said group to an adjacent one of said indicia of said group for ease of identification of said measuring indicia common to an associated one of said groups of measuring indicia, some of said blank spaces having different lengths along said elongated measure.

2. A measuring template as claimed in claim 1 wherein said distinctive identification means is a distinctive color.

3. A measuring template as claimed in claim 1 wherein said distinctive identification means comprises distinctive symbols.

4. A measuring template as claimed in claim 3 wherein each said distinctive symbol is comprised of at least two shaped symbols for distinguishing said groups from one another.

5. A measuring template as claimed in claim 1 wherein said elongated measure is a flat tape of flexible material, said tape having a top face, a back face and opposed elongated parallel side edges.

6. A measuring template as claimed in claim 5 wherein said tape is formed as an elongated retractable band which is wound in a tape housing and having a retention device at a free end thereof.

7. A measuring template as claimed in claim 5 wherein said tape is further provided with hole locating indicias to indicate a position of each of a plurality of holes to be made in a building component.

8. A measuring template as claimed in claim 5 wherein said tape has a width which corresponds to a width of a building component on which said tape is intended to be secured to.

9. A measuring template as claimed in claim 5 wherein there is further provided building component edge aligning markings disposed transversely of said longitudinal axis and extending to said parallel side edges.

10. A measuring template as claimed in claim 5 wherein said tape is secured on a flat outer surface of a construction sheeting material secured to building components to indicate a position of each of said building components.

11. A measuring template as claimed in claim 5 wherein there is further provided serrated perforations disposed on said transverse axis to permit said tape to be segmented into parts.

12. A measuring template as claimed in claim 5 wherein said tape is formed as an elongated tape of thermoplastic material having an adhesive on said back face and a release agent coating on said top face, said tape being coiled upon itself on a spool and retained in a tape dispenser.

13. A measuring template as claimed in claim 12 wherein said tape dispenser has a tape support ledge with a serrated tape severing lip to sever said tape transversely of said parallel side edges.

14. A measuring template as claimed in claim 13 wherein said tape is a transparent thermoplastic tape.

15. A measuring template as claimed in claim 12 wherein said tape dispenser is a refillable tape dispenser.

16. A measuring template as claimed in claim 1 wherein said elongated measure is provided with attachment means for maintaining said elongated measure on a flat surface.

17. A measuring template as claimed in claim 16 wherein said attachment means is constituted by a tab portion provided at a free end of said elongated measure.

18. A measuring template as claimed in claim 16 wherein said attachment means is an adhesive on a back face of said elongated measure for attaching said elongated measure to said flat surface, said elongated measure being formed from a substantially non-stretchable material.

19. A measuring template as claimed in claim 1 wherein said distinctive identification means comprises at least one color bar.

20. A measuring template as claimed in claim 1 wherein there is further provided edge aligning markings for positioning of building components at selected ones of said measuring indicia.

21. A measuring template as claimed in claim 1 wherein said template is a printed template disposed on a building component.

22. A measuring template as claimed in claim 21 wherein said building component is a framing stud.

* * * * *